US008275217B2

(12) United States Patent
Kube et al.

(10) Patent No.: US 8,275,217 B2
(45) Date of Patent: Sep. 25, 2012

(54) APPARATUS AND METHOD FOR COMBINING SEVERAL SUB-IMAGES FOR ANY IMAGING SURFACE AREAS

(75) Inventors: Matthias Kube, Fuerth (DE); Oliver Scholz, Moehrendorf (DE); Rolf Behrendt, Dormitz (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 515 days.

(21) Appl. No.: 12/438,803

(22) PCT Filed: Aug. 2, 2007

(86) PCT No.: PCT/EP2007/006861
§ 371 (c)(1),
(2), (4) Date: Oct. 2, 2009

(87) PCT Pub. No.: WO2008/025431
PCT Pub. Date: Mar. 6, 2008

(65) Prior Publication Data
US 2010/0067828 A1    Mar. 18, 2010

(30) Foreign Application Priority Data
Aug. 31, 2006    (DE) .......................... 10 2006 040 791

(51) Int. Cl.
*G06K 9/32*    (2006.01)
(52) U.S. Cl. ........ 382/294; 382/128; 382/129; 382/130; 382/131; 378/38; 378/39; 378/40
(58) Field of Classification Search .......... 382/128–131, 382/294; 378/38–40
See application file for complete search history.

(56) References Cited

U.S. PATENT DOCUMENTS

| | | | | | |
|---|---|---|---|---|---|
| 4,491,932 | A | * | 1/1985 | Ruhman et al. | 382/131 |
| 4,680,709 | A | * | 7/1987 | Srinivasan et al. | 378/14 |
| 4,797,942 | A | * | 1/1989 | Burt | 382/284 |

(Continued)

FOREIGN PATENT DOCUMENTS

DE    196 25 869 C2    1/2001

(Continued)

OTHER PUBLICATIONS

A new—mosaic., An et al., XP009091550 ISBN: 981-02-4481-9, 2000, pp. 699-700.*

(Continued)

*Primary Examiner* — Jayesh A Patel
(74) *Attorney, Agent, or Firm* — Michael A. Glenn; Glenn Patent Group

(57) ABSTRACT

An apparatus provides an image on the basis of a plurality of input images. The apparatus includes a first stage having at least a first and a second combiner, each of the combiners including a first storer for storing image data of the input images, a first processor for processing the image data of the input images into an intermediate image, and a second storer for storing image data of the intermediate image. The apparatus further includes a second stage having at least one further combiner, the further combiner including a third storer for storing image data of those intermediate images which are stored in the second storer of the first stage, a second processor for processing the image data from the third storer, so as to combine the image data of the intermediate images into the image, and a fourth storer for storing image data of the image.

8 Claims, 3 Drawing Sheets

U.S. PATENT DOCUMENTS

| | | | | |
|---|---|---|---|---|
| 4,941,094 | A * | 7/1990 | Satta et al. | 382/132 |
| 6,002,743 | A * | 12/1999 | Telymonde | 378/98.8 |
| 6,173,087 | B1 * | 1/2001 | Kumar et al. | 382/284 |
| 6,677,981 | B1 | 1/2004 | Mancuso et al. | |
| 6,915,003 | B2 * | 7/2005 | Oosawa | 382/130 |
| 7,027,665 | B1 | 4/2006 | Kagle et al. | |
| 7,376,254 | B2 * | 5/2008 | Barth | 382/131 |
| 7,412,086 | B2 * | 8/2008 | Sakas et al. | 382/131 |
| 2001/0054058 | A1 | 12/2001 | Del Pino | |
| 2004/0169870 | A1 * | 9/2004 | Ahmed et al. | 358/1.8 |
| 2004/0175057 | A1 * | 9/2004 | Tsao et al. | 382/294 |
| 2006/0023078 | A1 * | 2/2006 | Schmitt et al. | 348/222.1 |
| 2006/0098855 | A1 * | 5/2006 | Gkanatsios et al. | 382/128 |

FOREIGN PATENT DOCUMENTS

| | | | |
|---|---|---|---|
| DE | 10301941 | A1 | 8/2004 |
| DE | 10301941 | B4 | 11/2005 |
| EP | 0618719 | A | 10/1994 |
| EP | 618719 | A1 * | 10/1994 |

OTHER PUBLICATIONS

A VLSI—Time., Gupta et al., XP-002458188 1063-8210, IEEE, 2007, pp. 981-989.*

Gupta Nisheeth et al: "A VLSI architecture for image registration in real time" IEEE Trans Very Large Scale Integr VLSI Syst; IEEE Transactions on Very Large Scale Integration (VLSI) Systems Sep. 2007, Bd 15, Nr. 9, Sep. 2007, Seiten 981-989, XP002458188.

Xinghua An et al: "A new parallel algorithm of image mosaic" 2000 4$^{th}$ International Conference on Algorithms and Architectures for Parallel Processing World Scientific Singapore, 2000, Seiten 699-700, XP009091550.

* cited by examiner

APPARATUS AND METHOD FOR COMBINING SEVERAL SUB-IMAGES FOR ANY IMAGING SURFACE AREAS

CROSS-REFERENCE TO RELATED APPLICATIONS

This application is a U.S. national entry of PCT Patent Application Serial No. PCT/EP2007/006861 filed 2 Aug. 2007, and claims priority to German Patent Application No. 10 2006 040 791.1 filed 31 Aug. 2006.

BACKGROUND OF THE INVENTION

The present invention relates to an apparatus for optically recording a screen, for example a scintillator screen, in several individual images, which are then combined into an overall image, as occurs, for example, in digital radioscopy in the quality control of products.

The technical field of application of the invention described here advantageously comprises processing X-ray image data, in particular in industrial quality control of products which is performed by means of X-radiation. An important case of application is the detection of shrink holes, porosities or other blemishes in castings such as aluminum wheels. Since the imaging area of the test pieces in this field of application is often very large, an individual test piece cannot be tested by means of individual image pickups. To keep the test time as short as possible, several cameras or X-ray detectors are frequently used for composing an overall image from several individual pickups.

Especially in the X-ray examination of large objects, a detector may be employed which has as large an imaging surface area as possible, which may be composed of subareas. For subsequent evaluation of the individual images using software, the individual images may be combined into an overall image. Depending on the size of the object to be examined, a large number of individual images may occur in this context which have any geometries or arrangements. One advantage associated therewith is that the image processing for composing the individual images into the overall image may become very complex and time-consuming, depending on the geometries of the images and on the number of individual images.

For X-raying very large objects, the imaging surface areas provided by the X-ray image detectors are too small in most cases. In an alternative method, the object is therefore decomposed into sub-images by displacing the detector. Displacing the detector results in problems such as precise positioning, oscillations occurring when the detector is stopped, etc. This represents a large amount of mechanical expenditure for displacing the detector, and may involve synchronization between the displacement, the image pickup and the subsequent evaluation, which eventually leads to long test times. Specifically in industrial testing of products, long test times are extremely disadvantageous because test capacities are blocked as a result of the long test times, and because of the cost resulting therefrom.

DE 103 01 941 B4 describes a camera and a method for optical recording of a screen. The camera and method described here may be employed for sensing X-ray image data, i.e. for sensing individual images. In this context, the camera comprises a camera support with an array of camera mounts to which individual optical cameras are attached, as well as an image processing means for processing digital individual images of the array of individual optical cameras so as to generate an optical pickup of the screen at a predetermined overall resolution. In this context, the image processing means performs correction of the individual images with regard to alignment inaccuracies and/or parameter fluctuations, a correction resolution being used, for correction purposes, which is higher than the overall resolution, and a dedicated correction specification being used for correcting for each individual camera. Thus, a geometric correction of the individual images is conducted before they are combined into an overall image. The geometric correction comprises aligning the individual images both in a rotational and translational manner. Once the correction has been conducted, the corrected overall image is brought to the predetermined overall resolution by combining adjacent pixels. In this manner, utilization of favorable individual cameras enables efficient, low-cost and low-artifact imaging of a large-format screen. What is problematic in this context are the image processing times, since joining the individual images may take up a lot of time, it being possible for the process times to increase disproportionately as the number of individual images increases.

SUMMARY

According to an embodiment, an apparatus for providing an image of a subarea of an object on the basis of a plurality of input images may have: a first stage including at least a first combiner and a second combiner, each of the combiners including: a first storer for storing image data of the input images, the input image including a subarea of the object which includes any geometry and arrangement, a first processor for processing the image data of the input images into an intermediate image as a function of a predefined parameter for geometrically aligning the input images, and a second storer for storing image data of the intermediate image, wherein the input images of the first combiner and of the second combiner differ from one another; a second stage including at least one further combiner, the further combiner including: a third storer for storing image data of those intermediate images which are stored in the second storer of the first stage, a second processor for processing the image data from the third storer as a function of a predefined parameter for geometrically aligning the input images, so as to combine the image data of the intermediate images into the image, and a fourth storer for storing image data of the image; and a controller for defining a first parameter for geometrically aligning the input images for the processor of the first combiner, a second parameter for geometrically aligning the input images for the processor of the second combiner, and a third parameter for geometrically aligning the intermediate images for the processor of the further combiner on the basis of the subarea of the object, the controller being coupled to the processors.

According to another embodiment, a method of providing an image of a subarea of an object on the basis of a plurality of input images may have the steps of: defining first, second and third parameters on the basis of the subarea of the object; receiving image data of first input images, the input image including a subarea of the object which includes any geometry and arrangement; processing the image data of the first input images into a first intermediate image as a function of the first predefined parameter for geometrically aligning the first input images; providing the first intermediate image; receiving image data of second input images; processing the image data of the second input images into a second intermediate image as a function of the second predefined parameter for geometrically aligning the second input images; providing the second intermediate image; processing the image data of the first intermediate image and of the second intermediate image into the image as a function of the third predefined parameter for geometrically aligning the intermediate images; and providing the image.

Another embodiment may have a computer program including a program code for performing the method of providing an image of a subarea of an object on the basis of a plurality of input images, the method having the steps of: defining first, second and third parameters on the basis of the subarea of the object; receiving image data of first input images, the input image including a subarea of the object which includes any geometry and arrangement; processing the image data of the first input images into a first intermediate image as a function of the first predefined parameter for geometrically aligning the first input images; providing the first intermediate image; receiving image data of second input images; processing the image data of the second input images into a second intermediate image as a function of the second predefined parameter for geometrically aligning the second input images; providing the second intermediate image; processing the image data of the first intermediate image and of the second intermediate image into the image as a function of the third predefined parameter for geometrically aligning the intermediate images; and providing the image, when the program code is executed on a computer.

The present invention provides an apparatus for providing an image on the basis of a plurality of input images. The apparatus comprises a first stage having at least a first and a second combining means, each of the combining means comprising a first storage means for storing image data of the input images, a first processing means for processing the image data of the input images into an intermediate image, and a second storage means for storing image data of the intermediate image. The apparatus further comprises a second stage having at least one further combining means, the further combining means comprising a third storage means for storing image data of those intermediate images which are stored in the second storage means of the first stage, a second processing means for processing the image data from the third storage means, so as to combine the image data of the intermediate images into the image, and a fourth storage means for storing image data of the image.

The present invention further provides a method of providing an image on the basis of a plurality of input images, comprising a step of receiving image data of first input images, processing the image data of the first input images into a first intermediate image, and providing the first intermediate image. In addition, the method comprises a step of receiving image data of second input images, a step of processing the image data of the second input images into a second intermediate image, and a step of providing the second intermediate image. The method further comprises a step of processing the image data of the first intermediate image and of the second intermediate image into the image, as well as a step of providing the image.

Embodiments of the present invention offer the advantage that image processing, which combines the individual images into an overall image, is parallelized and may be made to form a pipeline structure. In accordance with this concept, image processing may occur in parallel in that initially, groups of individual images are combined into intermediate images, which for their part may subsequently be combined into an overall image by devices which, per se, are identical in design. The resulting structure of the image processing offers the possibility of conducting the image processing in a cascaded form. By means of clocking it is now possible to introduce new individual-image data into the resulting pipeline structure even before old intermediate-image data were combined into an overall image. The inventive apparatus thus offers the possibility of processing image data in the form of individual-image data and intermediate-image data of several overall images at the same time. Overall image processing may therefore be conducted in a considerably more efficient manner.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
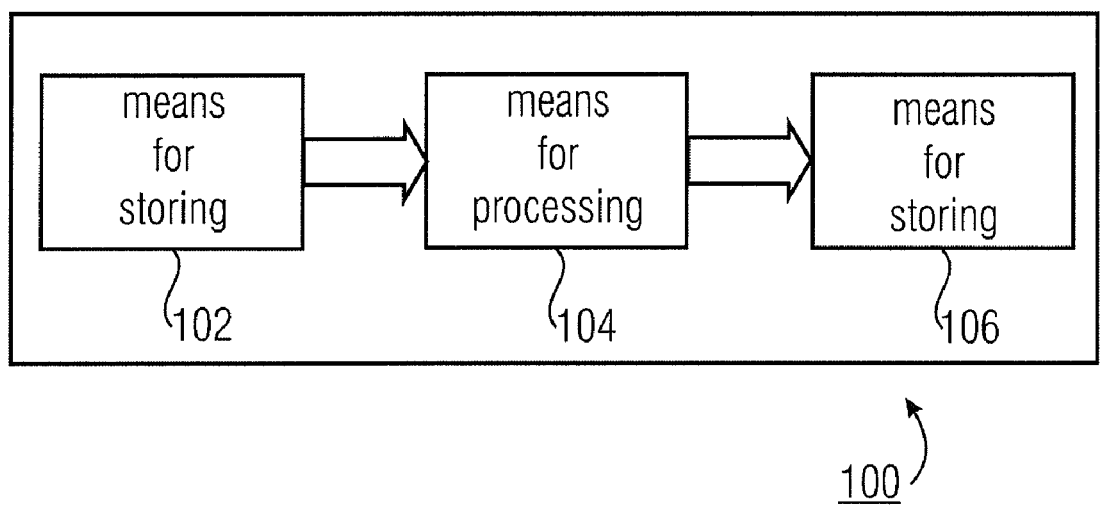
FIG. 1 shows a general block diagram of an embodiment of a combining means.

FIG. 1 shows a general block diagram of an embodiment of a combining means 100. The combining means 100 in FIG. 1 comprises a means 102 for storing image data of input images. The means 102 for storing image data of the input images makes this image data available to a means 104 for processing the image data of the input images into an intermediate image. The means 104 for processing the image data of the input images in turn makes the image data of the intermediate image available to a means 106 for storing the image data of the intermediate image. The means 104 for processing image data in this context combines image data of the input images, the pieces of image data of the individual images being geometrically adapted to one other, for example, depending on parameters. For example, it may be useful for the individual images to be displaced or rotated prior to being joined, which may then be conducted within the means 104 for processing image data. In another embodiment, for example, the light intensity levels, i.e. the brightness levels, or the contrast, of the individual images are matched to one another.

Figure 2:
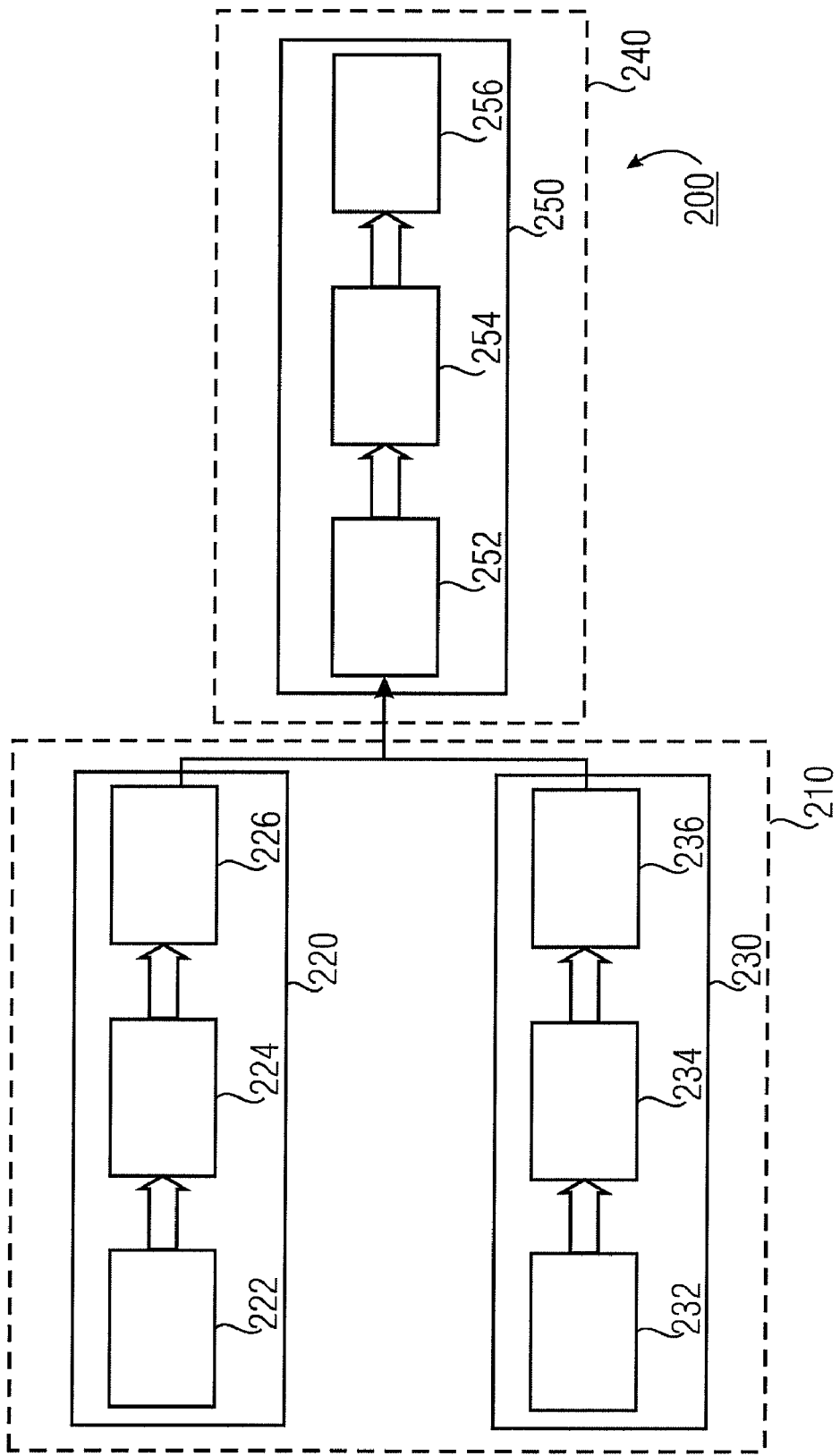
FIG. 2 shows a general block diagram of an embodiment of an inventive apparatus for providing an image.

FIG. 2 shows an embodiment of the inventive apparatus 200 for providing an image on the basis of a plurality of individual images. The apparatus 200 for providing an image comprises a first stage 210 having two combining means 220 and 230. In the embodiment shown in FIG. 2, the inventive apparatus 200 comprises only two combining means 220 and 230 at the first stage 210. Generally, embodiments of the present invention are not limited to two combining means per stage, but may comprise any number of combining means.

In the embodiment in FIG. 2, each of the combining means 220 and 230 is designed identically to the combining means explained with reference to FIG. 1. For example, the combining means 220 and 230 of the first stage 210 each comprise a storage means 222 and 232, respectively, for storing image data of input images, one processing means 224 and 234, respectively, for processing the image data of the input images into an intermediate image, and one storage means 226 and 236, respectively, for storing the image data of the intermediate image. The apparatus 200 for providing the image further comprises a second stage 240 having a further combining means 250. In the embodiment of FIG. 2, only one combining means 250 is shown at the second stage 240. Generally, the stage 240, is also not limited to the presence of one single combining means 250, but in principle, any number of combining means may be present in this context, too.

The combining means 250 of the second stage 240 is also designed similarly to the combining means discussed with reference to FIG. 1. The combining means 250 comprises a storage means 252 for storing image data of the input images, the input images of the combining means 250 now being made available, by the combining means 220 and 230, to the first stage 210, i.e. the input images of the second stage 240 are the output images of the first stage 210. The combining means 250 further comprises a processing means 254 for processing the image data of the intermediate images, and combines same into an image; in addition, the combining means 250 comprises a storage means for the storing 256 of image data of the image.

One may recognize from the embodiment of the inventive apparatus 200 in FIG. 2 that while the second stage 240 is processing image data, the storage means 222 and 232 for storing the input image data of the combining means 220 and 230 of the first stage 210 may already be written to again. This results in a pipeline structure.

Embodiments of the present invention provide that a user may view certain subareas, or regions of interest (ROI), for example during operation of a monitoring device in the production of castings. In such cases, it may occur that specific individual images are not used for being combined, or are viewed as blank images. For such cases, the inventive embodiments offer a very high level of flexibility, since any possibilities of combining image data of the individual and/or intermediate images may be realized and may be adjusted via parameters, for example within the processing devices. In one embodiment of the present invention, the combination parameters may be quickly adapted, for example via a control computer, so that a user may promptly switch over various subareas of an overall image.

On the basis of the individual images whose image data are stored, in the embodiment in FIG. 2, in the storage means 222 and 232 for storing image data of the input images, the apparatus 200 described here and the corresponding method serve to realize detectors consisting of many individual sensors which have any imaging surface areas and geometries. To this end, the individual images of the sensors are combined into an overall image in sequential stages which are referred to as stages 210 and 240 in the embodiment of FIG. 2, it being possible to adjust the manner in which the individual images are to be arranged within an overall image. The corresponding processing means 224 and 234, which at the first stage 210 process the individual-image data into intermediate images, may take into account respective parameters in this context. The same applies to the processing means 254 of the second stage 240, which may also take into account respective parameters for combining the intermediate images. During operation it is possible to activate only individual, adjacent sensors, so that a subarea of the object imaged is transmitted at a higher resolution (ROI=region of interest). To this end, it is possible, at each of the stages 210 and 240 in the embodiment of FIG. 2, to combine several pixels and thus to adjust the resolution desired.

The combining means 100 described in detail with reference to FIG. 1, or the combining means 220, 230, and 250 in the embodiment of FIG. 2, may comprise several image memories which store the image data of a specific number of individual images picked up by sensors, for example; the processing means 104, or 224, 234, and 254, for processing the image data of the individual images combine the individual images and could be realized, for example, by means of a microcontroller or processor. The data is then output for subsequent processing, which may be conducted, for example, by additional image memories which realize the storage means 106, 226, 236, or 256 for storing the image data of the intermediate images or of the images.

The manner in which a combining means, such as 100 in FIG. 1, or 220, 230, or 250 in FIG. 2, for example, combines the image data of the individual images from the storage means 102, 222, 232, or 252 may be adjusted via parameters in an embodiment of the present invention. In this context, the image data of the individual images may be arranged, for example, to be vertical, horizontal or square, or the individual image contents may be manipulated via the respective parameters.

In one embodiment of the present invention, for example the image addresses of the individual images, i.e. the manner in which they are arranged within the intermediate and/or overall images, are forwarded, within the context of the parameters given to the combining means, which image addresses may specify, for example, only one relevant subarea, or region of interest. In addition, parameters may be adjusted for a geometric correction, such as rotations, elongations, sections, overlaps etc. Optionally, the individual, intermediate and overall images may also be manipulated with regard to their image parameters, such as color settings, brightness settings, contrast, etc. In a further embodiment of the present invention, there is also the possibility of defining filters which filter or, e.g., smoothen out specific transitions within the images.

The number of individual images that may be taken into account in the storage means 102, 222, 232, or 254 is absolutely variable in this context. In addition, adjacent pixels may be combined, and an adjustable resolution may thus be achieved. When the inventive apparatus is switched on, fixed parameters, which are variable during operation, are made available to the apparatus, i.e. to the processing means 104, 224, 234, or 254, so as to thereby also obtain subareas of the imaged object at the resolution desired.

Figure 3:
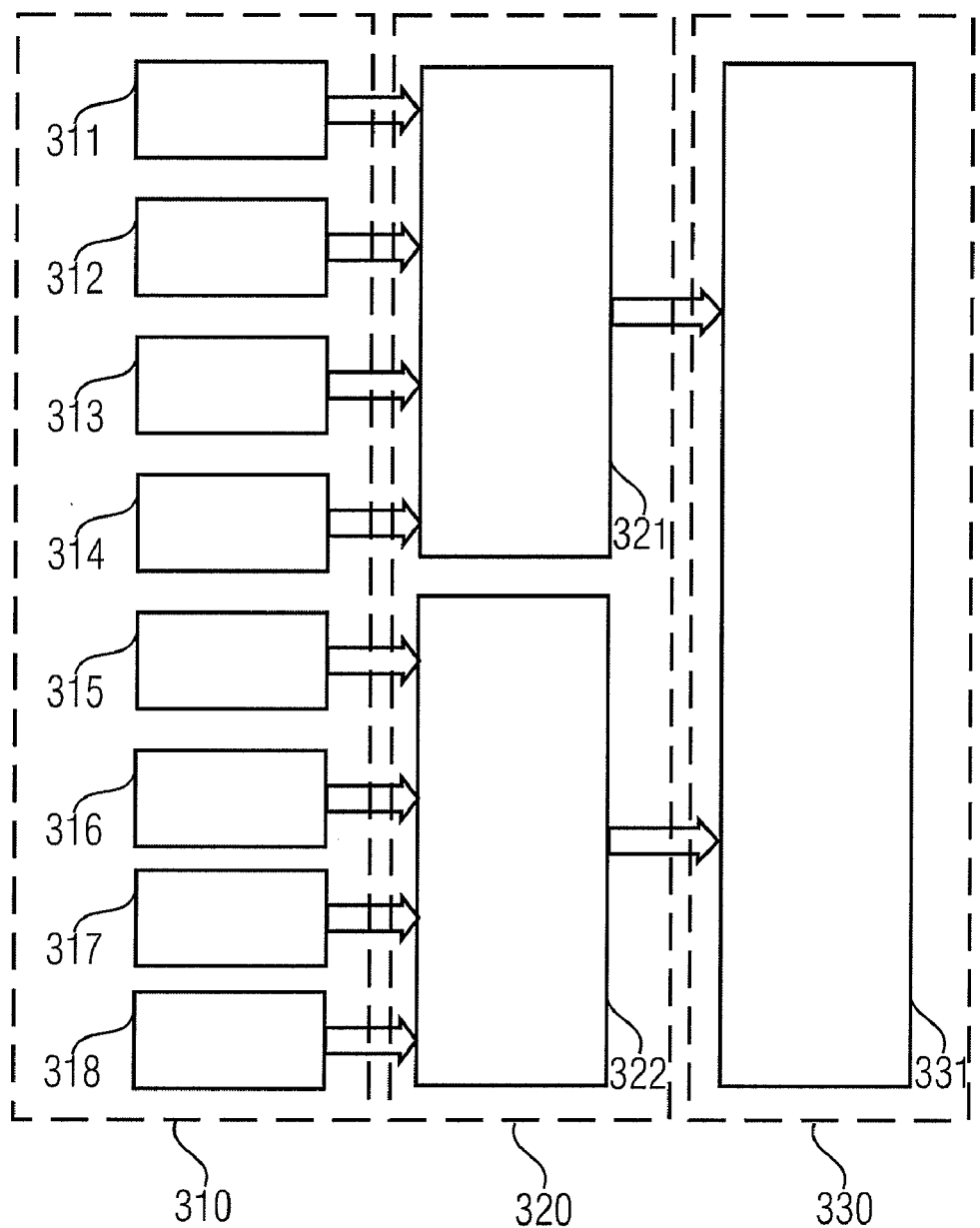
FIG. 3 shows a further embodiment of a cascade connection of combining means.

FIG. 3 shows a block diagram of a further embodiment of the present invention. FIG. 3 shows an apparatus 300 for providing an image, said apparatus being made up of three processing stages 310, 320, and 330. The first processing stage 310 is made up of the combining means 311-318 which are realized, for example, in accordance with the embodiment explained with reference to FIG. 1. However, this means that each of the combining means 311-318 comprises the means, depicted in FIG. 1, for storing image data of the input images, the means for processing the image data of the input images into an intermediate image or an image, and the means for storing the image data of the intermediate image or the image, before the data is either output or made available to the next processing stage. The second processing stage 320 in FIG. 3 also comprises two combining means 321 and 322, which obtain the image data of the input images from the combining means 311-318 of the first processing stage 310. The third processing stage 330 also comprises a combining means 321, which obtains the image data of the input images from the combining means 321 and 322 of the second processing stage 320 so as to combine said image data into an image or overall image.

In accordance with the embodiment of the present invention which was explained with reference to FIG. 3, several of these combining means may be hierarchically interconnected, so that a pipeline structure results. In principle, the resulting pipeline structures are clocked systems, i.e., for example, a first operating cycle comprises processing the image data of input images at the first processing stage, so that the intermediate images are available after the first clock. With the second clock, the intermediate images which were processed by the first processing stage, such as the first processing stage 310 in FIG. 3, are made available to the second processing stage, such as the processing stage 320. While the image data of the intermediate images which came into being during the first operating clock are processed at the processing stage 320, new image data of new input images may already be processed further at the first processing stage 310.

Due to the structure explained with reference to FIG. 3 it is possible to be able to process any number of input images, since any number of combining means may be connected in parallel. In this context, it is also possible to provide each combining means with parameters of its own, so that the different individual images may be combined in various manners. A result image of a stage, i.e. an intermediate image or an image, may then be combined again via further stages until the resulting image or overall image of the object to be imaged is made available after the last combining means. In this context, the number of processing stages is dependent on the number of sensors used, or on the size of the imaging surfaces areas. The pipeline structure results in that the number of stages has no influence on the image repetition rate of the sensors connected, since interleaved processing is enabled. Due to the possibility of combining in various manners, the sensors may be arranged in any geometry desired, i.e. the individual images may be arranged to be horizontal, vertical or square, or in any geometries.

A further advantage of the present invention is that by using the pipeline structure, any number of individual images may be processed efficiently. This advantage is achieved, on the one hand, in that individual-image data is processed in parallel, which is achieved by connecting any number of combining means in parallel. On the other hand, because of the pipeline structure, i.e. data which are processed at one processing stage are not influenced by the processing of data at the next processing stage up, i.e. not even at the underlying processing stage. This fact results in that individual-image data may be continuously input into the pipeline structure, and that overall images are available following operating cycles which correspond to a number of the levels of hierarchy.

In particular, it shall be noted that depending on the circumstances, the inventive scheme may also be implemented in software. The implementation may occur on a digital storage medium, in particular a disk or a CD having electronically readable storage signals which may cooperate with a programmable computer system and/or microcontroller such that the corresponding method is performed.

Generally, the invention thus also consists in a computer program product having a program code, stored on a machine-readable carrier, for performing the inventive method, when the computer program product runs on a computer and/or microcontroller. In other words, the invention may therefore be realized as a computer program having a program code for performing the method, when the computer program runs on a computer and/or microcontroller.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for providing an image of a subarea of an object on the basis of a plurality of input images, comprising:
   a first stage comprising at least a first combiner and a second combiner, each of the combiners comprising:
      a first storer for storing image data of the input images, the input image comprising a subarea of the object which comprises any geometry and arrangement,
      a first processor for processing the image data of the input images into an intermediate image as a function of a predefined parameter for geometrically aligning the input images, and
      a second storer for storing image data of the intermediate image,
   wherein the input images of the first combiner and of the second combiner differ from one another;
   a second stage comprising at least one further combiner, the further combiner comprising:
      a third storer for storing image data of those intermediate images which are stored in the second storer of the first stage,
      a second processor for processing the image data from the third storer as a function of a predefined parameter for geometrically aligning the input images, so as to combine the image data of the intermediate images into the image, and
      a fourth storer for storing image data of the image; and
   a controller for defining a first parameter for geometrically aligning the input images for the processor of the first combiner, a second parameter for geometrically aligning the input images for the processor of the second combiner, and a third parameter for geometrically aligning the intermediate images for the processor of the further combiner on the basis of the subarea of the object, the controller being coupled to the processors.

2. The apparatus as claimed in claim 1, wherein the first storer of the first stage are further coupled to different individual sensors comprising any imaging surface areas and imaging geometries.

3. The apparatus as claimed in claim 1, wherein the first or second processor is implemented to manipulate the image data, on the basis of a further parameter, with regard to the levels of intensity of individual pixels.

4. The apparatus as claimed in claim 1, wherein the storers are implemented to store image data of a plurality of input images, intermediate images or images.

5. The apparatus as claimed in claim 1, comprising a plurality of stages which each comprise combiners implemented to make the image data of an intermediate image of a stage available as image data of the input images of a next stage up.

6. The apparatus as claimed in claim 1, wherein the first stage comprises a multitude of combiners, and the controller is implemented to adapt the parameters, on the basis of the subarea of the object, such that at least the image data of an input image is discarded and is not processed into an intermediate image.

7. A method of providing an image of a subarea of an object on the basis of a plurality of input images, comprising:
   defining first, second and third parameters on the basis of the subarea of the object;
      receiving image data of first input images, the input image comprising a subarea of the object which comprises any geometry and arrangement;
      processing the image data of the first input images into a first intermediate image as a function of the first predefined parameter for geometrically aligning the first input images;

providing the first intermediate image;
receiving image data of second input images;
processing the image data of the second input images into a second intermediate image as a function of the second predefined parameter for geometrically aligning the second input images;
providing the second intermediate image;
processing the image data of the first intermediate image and of the second intermediate image into the image as a function of the third predefined parameter for geometrically aligning the intermediate images; and
providing the image.

8. A non-transitory computer readable medium comprising a computer program code for performing the method of providing an image of a subarea of an object on the basis of a plurality of input images, the method comprising:

defining first, second and third parameters on the basis of the subarea of the object;
receiving image data of first input images, the input image comprising a subarea of the object which comprises any geometry and arrangement;
processing the image data of the first input images into a first intermediate image as a function of the first predefined parameter for geometrically aligning the first input images;
providing the first intermediate image;
receiving image data of second input images;
processing the image data of the second input images into a second intermediate image as a function of the second predefined parameter for geometrically aligning the second input images;
providing the second intermediate image;
processing the image data of the first intermediate image and of the second intermediate image into the image as a function of the third predefined parameter for geometrically aligning the intermediate images; and
providing the image,
when the program code is executed on a computer.

* * * * *